United States Patent [19]

Al-Yazdi

[11] Patent Number: 5,104,556

[45] Date of Patent: Apr. 14, 1992

[54] OIL WELL TREATMENT COMPOSITION

[75] Inventor: Ahmed M. Al-Yazdi, Abu Dhabi, United Arab Emirates

[73] Assignee: Mirada Bay Petroleum Products, Inc., Lexington, Ky.

[21] Appl. No.: 573,558

[22] Filed: Aug. 27, 1990

Related U.S. Application Data

[63] Continuation-in-part of Ser. No. 378,809, Jul. 12, 1989, abandoned.

[51] Int. Cl. ............... E21B 37/00; E21B 43/25
[52] U.S. Cl. ............... 252/8.552; 252/8.551; 252/8.553; 166/304
[58] Field of Search ............ 252/8.552, 8.553, 8.551; 166/304

[56] References Cited

U.S. PATENT DOCUMENTS

| | | | |
|---|---|---|---|
| 2,125,429 | 8/1938 | Denker et al. | 252/8.553 |
| 2,158,374 | 5/1939 | Merrill | 252/312 |
| 2,289,536 | 7/1942 | Bradley | 252/312 |
| 2,342,656 | 2/1944 | Frye et al. | 252/8.552 |
| 2,356,205 | 8/1944 | Blair | 252/8.552 |
| 2,908,641 | 10/1959 | Boyle | 252/8.554 |
| 2,970,958 | 2/1961 | Shapiro | 252/8.552 |
| 3,612,181 | 10/1971 | Brooks | 166/295 |
| 3,914,132 | 10/1975 | Sutton | 252/8.552 |
| 3,970,148 | 7/1976 | Jones et al. | 252/8.552 |
| 4,207,193 | 6/1980 | Ford et al. | 252/8.552 |
| 4,570,656 | 2/1986 | Matlach et al. | 252/8.551 |
| 4,737,296 | 4/1988 | Watkins | 252/8.553 |

OTHER PUBLICATIONS

Coppel, C. P., Newberg, P. L., Field Results of Solvent Stimulation in a Low-Gravity-Oil Reservoir, Journal of Petroleum Technology, Oct. 1972, pp. 1213-1218.

*Primary Examiner*—Robert L. Stoll
*Assistant Examiner*—Chhaya Sayala
*Attorney, Agent, or Firm*—Barnes & Thornburg

[57] ABSTRACT

Solvent compositions for dissolution of both asphaltene and paraffin petroleum based deposits are described. Solvent compositions comprising kerosene and alkyl phenols, preferably cresol, have been found most efficient in oil well cleaning applications. This efficiency can be enhanced by the addition of an alkylamine. Compositions containing other aliphatic hydrocarbon solvents and more than 3% by volume alkyl phenols also exhibit good solvent properties for petroleum deposits. Oil production can be enhanced following well treatment in accordance with the disclosed invention.

16 Claims, 1 Drawing Sheet

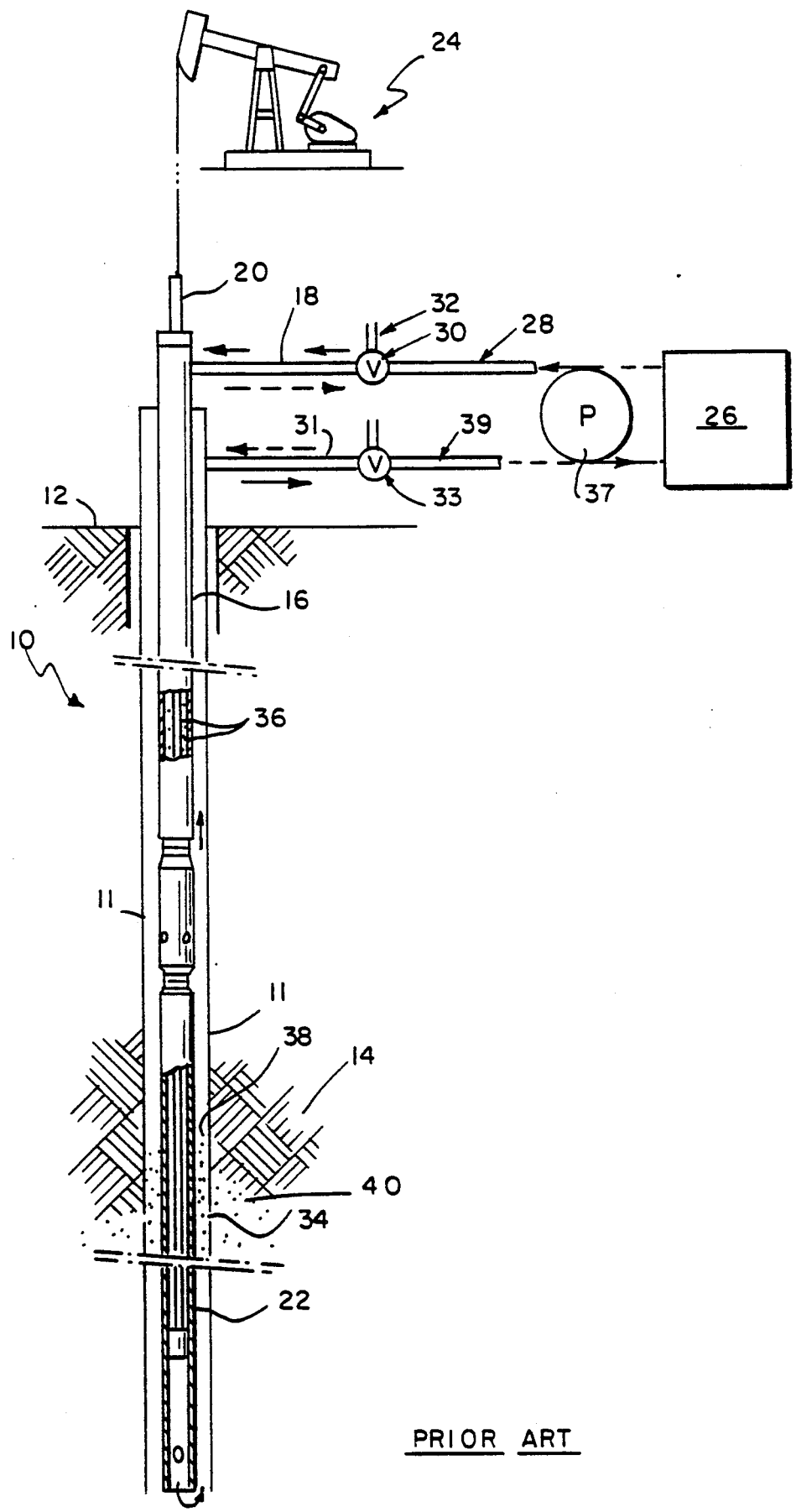
PRIOR ART

OIL WELL TREATMENT COMPOSITION

This is a continuation-in-part application of the co-pending patent application entitled "Oil Well Treatment Composition", U.S. Ser. No. 07/378,809, filed Jul. 12, 1989, now abandoned.

FIELD OF THE INVENTION

This invention relates to a composition useful for the dissolution of petroleum based deposits. More particularly, this invention relates to a composition and method for treatment of a petroleum producing well to remove paraffin and asphaltene deposits and enhance well production.

BACKGROUND AND SUMMARY OF THE INVENTION

Petroleum is a complex mixture of paraffinic, cycloparaffinic, and aromatic hydrocarbons containing components that range in character from free-flowing liquids to waxy solids and tars. Generally, the solid components are termed paraffinic if their primary composition is aliphatic, and asphaltenic if the primary composition is aromatic. Both asphaltenes and paraffins are commonly found associated with petroleum.

Recovery of petroleum contained in geologic formations is often hindered by the presence of paraffinic or asphaltenic solids. During recovery or processing of crude petroleum high molecular weight paraffinic or asphaltenic compounds can precipitate as waxy or tarry solids. These solids tend to fill the pores of the petroleum reservoir rock, and additionally clog well-casings, tubing, and other auxiliary equipment used in petroleum recovery or processing. Wells plugged by paraffins or asphaltenes have a diminished production rate, and extreme cases of deposition can lead to the total loss of well production.

Although several methods of removing deposited solids have been developed, including mechanical scraping, treatment with hot oil, or treatment with aqueous surfactants, the use of organic solvents to remove paraffinic and asphaltenic deposits is often preferred because of their efficacy and economy of use. Although many industrial solvents have been evaluated for removal of paraffinic and asphaltenic deposits, considerations of cost, safety, and efficiency of deposit dissolution has resulted in only a few solvent compositions being used commercially. Among the solvents that have been tried to remove paraffin deposits are straight chain hydrocarbons, such as kerosene, diesel oil, naphtha, or even light crude oil. These compositions have shown some solvent functionality but their efficacy is highly dependent on the type of petroleum deposit. Asphaltenes are most efficiently removed by aromatic solvents such as benzene, toluene, or xylene, which themselves exhibit a much reduced capacity to dissolve paraffinic hydrocarbons. Because their high volatility, low flash points, and high carcinogenic potential collectively create a substantial human and environmental hazard, commercial use of aromatic solvents is limited.

Solvent additives are known to effect the dissolution characteristics of solvent compositions. For example, the addition of small amounts of additives such as carbon disulphide, n-butylamine, dicyclopentadiene, or xylene, to selected solvents has been shown to improve their effectiveness as solvent compositions used for oil well treatment. However, many art-recognized solvent additive compositions can be unsafe in addition to having the substantial drawbacks of expense and varying utility in removing asphaltene or paraffin deposits from oil wells.

It is therefore an object of the present invention to provide a safe, inexpensive, and efficient method and a composition for dissolution of asphaltenic and paraffinic deposits derived from petroleum.

It is a further object of this invention to provide a method and a composition for removal of solid deposits from petroleum recovery and processing equipment.

It is yet another object of this invention to provide a method and a composition for removing petroleum derived solids deposited in the pore spaces of a petroleum reservoir rock.

Those objects and others are accomplished in accordance with one embodiment of this invention comprising a mixture of an aliphatic hydrocarbon petroleum distillate and at least 3% by volume of an alkyl phenol. For the purposes of the present invention, aliphatic hydrocarbon petroleum distillates are defined to include small fractions of aromatic and cyclic hydrocarbons in addition to the predominant straight chain alkane components. Preferably, the alkyl phenol is utilized in the composition of the present invention in an amount of about 3% to about 15% by liquid volume. In one preferred embodiment about 4% to about 7%, more preferably about 5% by volume of alkyl phenol is utilized in admixture with an aliphatic hydrocarbon petroleum distillate. While cresol is a preferred alkyl phenol for use in the composition of this invention, cresylic acid, an industrial grade fraction containing $C_9$-phenols, can be used in admixture with aliphatic hydrocarbon distillates in amounts ranging between about 3% and 15% by volume of the mixture. As defined herein and with reference to the Condensed Chemical Dictionary, 9th Edition, cresylic acid is derived from petroleum and consists of an industrial cut of phenolic material boiling above the cresol range. A typical commercial cut contains less than 1% cresol. Cresylic acid is predominantly composed of xylenols and $C_9$ phenols.

This invention is also directed to a composition comprising a mixture of kerosene and an alkyl phenol for dissolution of paraffinic and asphaltenic deposits. Preferably, the alkyl phenol is a cresol, present in the composition at about 1% to about 15%, more preferably about 3% to about 7%, by liquid volume. In a most preferred embodiment of this invention a composition if provided which comprises 5% cresol by volume in admixture with kerosene.

BRIEF DESCRIPTION OF THE DRAWING

The FIGURE is a part schematical, part diagrammatical illustration of an apparatus for use of the present invention.

DETAILED DESCRIPTION OF THE INVENTION

Referring to the FIGURE, there is illustrated a cased borehole 10 for the extraction of petroleum (not shown) situated below ground surface 12 in rock reservoir 14. Petroleum present in rock reservoir 14 is admitted to cased borehole 10 through a plurality of perforations 34 in borehole casing 11 and is pumped above the ground surface 12 through a production tubing 16 axially situated in the cased borehole 10. Pumping action is provided by action of sucker rod 20, reciprocally driven by a conventional pumpjack 24, along with an auxiliary downhole pump 22. Petroleum pumped above ground surface 12 passes through production tubing 16 into outflow piping 18, and thereafter through valve 30 into a piping 32 for transfer to storage or additional processing.

The pumped flow of petroleum from the rock reservoir 14 can be reduced or even interrupted by deposits of solid petroleum components in rock reservoir 14, in borehole casing 11 and in production tubing 16. The deposited components, generally dissolved in the petroleum under equilibrium conditions in the reservoir rock 14 tend to precipitate or otherwise form solid deposits as the petroleum is pumped from reservoir rock 14. This is believed to be caused by cooling through radiative or conductive contact with borehole components, by expansion, and by hydrostatic pressure drop associated with pumping of the petroleum. Petroleum solid deposits 36, 38 and 40 in production tubing 16, borehole casing 11, and rock reservoir 14, respectively, are common.

While the deposits consist predominantly of paraffins and lesser amounts of asphaltenes, the composition of the petroleum derived deposit can vary from one locale to another. Normally, the composition of deposits is dependent on the gravity of the crude oil produced. Low API gravity of crude oil corresponds to a high asphaltene content. High asphaltene content in turn corresponds to a possibility of forming asphaltene based petroleum deposits when conditions of production permit deposit formation.

Asphaltenes consist of a variable mixture of polycyclic, condensed, aromatic ring compounds. Because of the presence of covalently bound oxygen, sulfur, and nitrogen containing radicals, and various metals, asphaltene is typically a more polar substance than the paraffins. In crude oils, asphaltic particles tend to form micelles that are generally spherical in shape and range from 30 to 65 angstroms in diameter, with the asphaltenes forming the nucleus of the micelle. Lighter, less aromatic components and paraffins surround the nucleus of the micelle, establishing a colloidal system that keeps the aromatic asphaltene suspended in the petroleum. Asphaltene deposits are particularly unwanted because of the difficulty in cleaning the thick, viscid, and tarry substance without recourse to toxic aromatic solvents. Even in low concentrations asphaltene deposits are detrimental to petroleum production, in part because asphaltenes can act as nucleating agents for the deposition of paraffins.

Paraffins are high molecular weight straight or branched chain alkanes normally present in petroleum. When deposited, paraffins are often characterized as waxy. The consistency and texture of paraffins widely varies according to the average length of the alkane chains, and can vary from a soft mush to a hard and brittle material. Although paraffins can be deposited from the petroleum when conditions of paraffin/supersaturation exists, such conditions do not necessarily lead to paraffin deposition. Paraffins can remain in a supersaturated state unless a nucleating material, often in the form of asphaltenic particles, is present. Even if minor crystallization of paraffin occurs, the paraffin particles are typically dispersed evenly in the petroleum and do not clog petroleum transfer tubing. However, asphaltenic particles, in addition to acting as nucleating agents, can also act as agglomeration sites, in which large masses of paraffin crystals combine to form a waxy/tarry deposit that reduces liquid flow through the rock reservoir 14, borehole casing perforations 34, and the production tubing 16, as well as any other part of the petroleum transport piping in direct contact with the petroleum.

Since paraffins are soluble in petroleum distillates such as kerosene, diesel, gasoline, or other aliphatic hydrocarbons, these or similar solvents have been used to remove paraffin deposits. However, solvents suitable for removing paraffin deposits are not so effective for removal of troublesome asphaltene deposits. Asphaltenic constituents exhibit greatest solubility in aromatic solvents such as toluene or benzene.

In accordance with the present invention a well treating composition (not shown in the FIGURE) comprising an aliphatic hydrocarbon petroleum distillate and about 3% to about 15% by volume alkyl phenol is utilized for efficient and economic removal of petroleum derived deposits of both paraffins and asphaltenes from petroleum recovery and processing equipment and from rock formations containing such petroleum deposits.

Aliphatic hydrocarbon petroleum distillates are widely available in industrial quantities because of their many uses as solvents, chemical precursors and fuels. Preferred aliphatic hydrocarbon distillates for the purpose of this invention can include diesel oil, gas oil, kerosene, gasoline, petroleum spirit, petroleum ether, naphtha, or shale oil distillates.

A preferred alkyl phenol for the purposes of the present invention is the first member of the alkyl phenol homologous series, methyl phenol, which has the trivial name of cresol. Although reagent-grade cresol is available in ortho, meta, or para isomeric form, for the purposes of the present invention an industrial grade cresol composed of a mixture of these isomers is satisfactory. Cresol is obtained from coal tar or petroleum by fractional distillation processes.

An alternative composition containing alkyl phenols that is industrially available is cresylic acid. Cresylic acid is a commercial mixture of phenolic materials having boiling points above the cresol range. By an arbitrary industrial standard in use for cresylic acid production, at least 50% of the material must boil above 204° C. Material boiling below that point is termed cresol. A typical commercial cut of cresylic acid has less than 1% cresol. The major constituents of cresylic acid are $C_9$-alkyl phenols, present in an amount ranging from about 50 to 60%, with the remainder being a mixture of various isomeric forms of xylenol.

In an alternate embodiment of this invention there is provided a composition for dissolving petroleum derived deposits which comprises an admixture of kerosene and an alkyl phenol. Kerosene is a petroleum distillate which is water-white, oily liquid having a strong odor. The boiling range of kerosene is between 170° to 310° C., and its flash point is 38° to 66° C. The autoignition temperature of kerosene is 229° C. As compared to combinations of alkyl phenols with other aliphatic hydrocarbon distillates such as diesel or gas oil, admixtures of kerosene and an alkyl phenols have been found to exhibit a superior dissolving power when applied to petroleum derived deposits.

Preferably kerosene is combined with about 1% to about 15% by volume of an alkyl phenol. More preferably the composition comprises kerosene and about 3% to about 7% of an alkyl phenol by volume, and in a most preferred embodiment, about 5% of the composition is an alkyl phenol.

In another preferred embodiment of this invention there is provided a composition which comprises kerosene combined with about 1% to about 15% by volume of a cresol. Preferably the composition includes about 3% to about 7% of a cresol by volume, and in a most preferred embodiment, about 5% of the composition is cresol.

The alkyl phenol components of cresylic acid are suitable additives to a composition for dissolving petroleum derived solids according to this invention. Thus this invention provides for a composition which comprises kerosene combined with about 1% to about 15% by volume of cresylic acid. Preferably the composition includes about 3% to about 7% of a cresylic acid by volume. In a most preferred embodiment, about 5% of the composition is cresylic acid.

An alternative embodiment of this invention there is provided a composition which comprises an aliphatic hydrocarbon petroleum distillate combined with about 3% to about 15% by volume of an alkyl phenol. Preferably, the composition includes about 4% to about 7% alkyl phenol by volume, and in the most preferred embodiment, about 5% of the composition is an alkyl phenol.

In a preferred embodiment, cresol is selected as the alkyl phenol. The aliphatic hydrocarbon petroleum distillate is mixed with a cresol so that about 3% to about 15% of the mixture by volume consists of cresol. More preferably, the mixture has about 4% to about 7% of cresol by volume, and in the most preferred embodiment, about 5% of the mixture is cresol.

In an alternative embodiment, cresylic acid is employed as the alkyl phenol component. The aliphatic hydrocarbon petroleum distillate is mixed with cresylic acid so that about 3% to about 15% of the mixture by volume consists of cresylic acid. More preferably, the mixture has about 4% to about 7% of cresylic acid by volume, and in the most preferred embodiment, about 5% of the mixture is a cresylic acid.

To increase the ease of transport, as well as provide a greater range of solvent composition formulations, the solvent compositions of the present invention can be mixed on-site from a concentrate containing greater than 20% by volume of cresol. A preferred concentrate is about 50% cresol mixed with about 50% kerosene or other aliphatic hydrocarbon. Alkyl phenols such as cresylic acid can also be provided as concentrates. Again the preferred range is greater than 20% by volume of the alkyl phenol mixed with an aliphatic hydrocarbon. These concentrates can be diluted to the desired concentration with aliphatic hydrocarbons such as diesel or kerosene on-site at the oil well. In addition to extending the range of concentrations of cresol or alkyl phenols that can be prepared, the concentrate can be directly used in small amounts to remove small amounts of particularly resistant asphaltenic deposit.

A wide range of surfactants, dispersants, solvents, and emulsifiers can be added to the present solvent compositions or concentrates to further improve their paraffin/asphaltene dissolving capacity. For example, small amounts of naphthol, xylene, toluene or surfactants can be added. A preferred additive for the composition of the present invention is a primary or secondary $C_3$-$C_8$ alkyl amine. A most preferred additive is n-butylamine. In a preferred composition, about 0.1% to about 1% by volume of the composition is n-butylamine.

A method in accordance with the present invention comprises contacting the paraffin/asphaltene deposit bearing surfaces in an oil well with a composition of this invention. Again referring to the FIGURE the solvent composition (not shown in FIGURE) is stored in tank 26 at the oil well site. For typical applications involving oil wells with a depth of 1000 to 2000 feet, between 200 to 1000 gallons of the solvent composition is sufficient to remove petroleum derived asphaltenic and paraffinic deposits in the well to enhance well production. The small amount of solvent composition required enables tank 26 to be portable.

As indicated by the solid arrows, the solvent composition is circulated from tank 26 by a reversible circulating pump 37 through a supply pipe 28, valve 30, and outflow pipe 18 and into production tubing 16 to dissolve petroleum derived asphaltenic and paraffinic deposits in the interior of the production tubing 16 such as a production tubing deposit 36. The fluid circuit is completed by routing the flow of the solvent composition through borehole casing 11, outflow pipe 31, valve 33, pipe 39, and through the reversible circulating pump 37 into the tank 26. As indicated by the broken arrows, circulation of the solvent composition can be reversed if desired.

The amount of solvent composition to be employed in this method and the duration of well treatment depends upon the oil well depth, rock type, and type and extent of paraffin or asphaltenic deposition. These factors are either known or they can be determined by those skilled in the art using art-recognized well monitoring techniques. In a preferred embodiment, continuous circulation is maintained until the petroleum derived deposits are removed. Alternatively, the solvent composition can be introduced into borehole casing 11 and allowed to soak for a period of 24 to 72 hours. In other embodiments, a combination of soaking and surging steps can be used to dissolve and mechanically fragment the petroleum derived deposit by turbulent fluid flow. If rock reservoir 14 is determined to be clogged with petroleum derived deposits, the solvent composition can likewise be pumped into rock reservoir 14, and following a one-day to five-day soaking period, pumped out of the reservoir by the reversible circulating pump 37 with dissolved deposits.

EXAMPLE 1

A solvent composition consisting of a liquid mixture of 96.75% by volume of kerosene, 3.00% by volume of industrial-grade cresol having ortho, meta, and para isomeric forms, and 0.25% by volume of n-butylamine was prepared for laboratory evaluation. Various reservoir rock cores containing petroleum derived deposits were measured by standard methods for porosity and permeability. These cores were then soaked in the solvent composition. Again using standard measurement methods, the porosity of the reservoir rock cores was found to have improved by as much as 200%, and the permeability of the reservoir rock cores improved by as much as 300%.

A solvent composition consisting of a liquid mixture of 94.75% by volume of kerosene, 5.00% by volume of industrial-grade cresol having ortho, meta, and para isomeric forms, and 0.25% by volume of n-butylamine was also prepared for laboratory evaluation. This composition was found to have better results as compared to the composition containing 3.00% cresol.

EXAMPLE 2

A solvent composition consisting of a liquid mixture of 96.75% by volume of kerosene, 3.00% by volume of industrial-grade cresol having ortho, meta, and para isomeric forms, and 0.25% by volume of n-butylamine was prepared for field evaluation. A 3.00% by volume addition of cresol was selected over higher percentages in order to minimize the cost of the solvent composition. The mixture was used in an oil well that was being worked over for recompletion. The drill pipes were stuck in the borehole because of heavy asphaltenic deposits present on the packer. Following several unsuccessful attempts to release the packer by recirculating gas-oil through the oil well, 212 cubic feet of the solvent composition was circulated through the oil well for four hours. The packer and drill pipes were released, and analysis of resulting composition revealed that over 3300 pounds of asphaltenic material originally present in the borehole casing had been dissolved by the composition.

EXAMPLE 3

A composition corresponding to that of Example 2 was prepared for use on a water injection well. Because of petroleum derived deposits, the rock formation was not accepting acid that was to be injected for the purpose of acidizing the water injection well. Previously, the well had been treated with 1000 cubic feet of kerosene but no improvement in acidization was indicated. However, after 565 cubic feet of the solvent composition of the Example 2 was injected into the well, the acidization of the formation was successfully carried out and the rate of water injection into the rock formation was improved.

EXAMPLE 4

A solvent composition 94.70% by volume kerosene, 5.0% by volume of industrial-grade cresol having ortho, meta and para isometric forms and 0.30% by volume of n-butylamine was prepared for use on a water injection well. Because of petroleum derived deposits, the rock formation was accepting water at a very low rate. Previously, the well had been treated with kerosene injected under extremely high pressures, but no improvement in water injection rate was indicated.

Approximately 350 cubic feet of the solvent composition of the present invention was injected into the water injection well as a slug moving in front of injected water. The solvent composition was initially injected at a rate of 42 gallons per minute at 2800 psi. The injection rate was then increased to 53 gallons per minute at 2500 psi. Following this treatment, the water injection rate was increased to 135 gallons per minute at a wellhead pressure of 2000 psi.

EXAMPLE 5

A solvent composition corresponding to that of Example 4 was prepared for use on a water injection well. Because of petroleum derived deposits, the rock formation was accepting water at a very low rate. After several acidization attempts, no improvement in water injection rate into the desired rock formation was indicated.

Approximately 530 cubic feet of the composition of the present invention was injected into the water injection well. Following this treatment, the water injection rate was substantially increased to a steady 80 gallons per minute at a wellhead pressure of 2900 psi.

EXAMPLE 6

A solvent composition corresponding to that of Example 2 was prepared for use on a water injection well. Measurement of the water injection rate using a Spinner was hindered because of the presence of petroleum derived deposits on the interior of the production tubing, in the cased borehole, and in the region about the perforations. After the oil well was injected with 635 cubic feet of the solvent composition to dissolve the interfering petroleum derived deposits, the water injection rate could be measured without deposit interference.

EXAMPLE 7

A solvent composition corresponding to that of Example 2 was prepared for use on the engine of a drilling rig. The engine was inoperable due to plugging of the lubricating lines with tarry deposits from lubricating oil. Mechanical methods of cleaning the lines were unsuccessful. The lubricating lines were disconnected and soaked in the composition for 48 hours. After soaking, the lubricating lines were found to be completely free of interfering deposits.

EXAMPLE 8

A solvent composition consisting of 3.00% by volume of industrial-grade cresol having ortho, meta, and para isomeric forms in combination with diesel and kerosene was prepared from a solution of 50% by volume of kerosene and 50% by volume of the cresol. Preparation of the solvent composition involved dilution of the 50% cresol and kerosene solution with diesel until the 3% cresol level was achieved. The solvent composition was used to treat a well (the "Hodge well") that had previously received monthly treatments of another type of cleaning solvent. The average production of the Hodge well was 7.5 barrels of oil. Treatment with the cresol and kerosene solution was continued at the same frequency and volume as prior treatment solutions. After three treatments with the cresol and kerosene solution in the course of three months, the average weekly production had increased to about 8.75 barrels of oil.

EXAMPLE 9

A solvent composition consisting of 3.00% by volume of industrial-grade cresol having ortho, meta, and para isomeric forms in combination with kerosene was prepared from a solution of 50% by volume of kerosene and 50% by volume of the cresol. Preparation of the solvent composition involved dilution of the 50% cresol and kerosene solution with kerosene until the 3% cresol level was achieved. This solvent composition was prepared for introduction into an oil and gas well (the "Mariata well") that had not received any prior treatment. Prior to treatment with the cresol and kerosene solvent composition the average production of the Mariata well was 1.0 barrel of oil and 3 mcf of natural gas a day. About 55 gallons of the solvent were introduced into the well and allowed to stand for about one week. Following treatment, production of oil increased to 12.75 barrels a week and the production of natural gas increased to 7 mcf.

What is claimed is:

1. A composition for dissolving petroleum derived deposits consisting essentially of an admixture of about 85% to about 99% by volume of kerosene and of about 1% to about 15% by volume of an alkyl phenol.

2. The composition of claim 1 wherein the alkyl phenol comprises cresol.

3. The composition of claim 2 wherein the volume percentage of cresol is between about 3% and 7%.

4. The composition of claim 2 wherein the volume percentage of cresol is about 5%.

5. The composition of claim 1 wherein the alkyl phenol comprises cresylic acid.

6. A composition for dissolving petroleum derived deposits consisting essentially of a mixture of about 85% to about 97% by volume of an aliphatic hydrocarbon and about 3% and about 15% by liquid volume of an alkyl phenol.

7. The composition of claim 6 wherein the alkyl phenol is cresol.

8. The composition of claim 7 wherein the volume percentage of cresol is between about 4% and about 7%.

9. The composition of claim 7 wherein the volume percentage of cresol is about 5%.

10. The composition of claim 6 wherein the alkyl phenol comprises cresylic acid.

11. A method for dissolving asphaltenic and paraffinic deposits comprising the step of applying to said deposits a composition consisting essentially of about 85% to about 97% by volume of an aliphatic hydrocarbon petroleum distillate and about 3% to about 15% by volume of an alkyl phenol.

12. The method of claim 11 wherein the aliphatic hydrocarbon petroleum distillate comprises kerosene.

13. The method of claim 11 wherein the alkyl phenol comprises cresol.

14. The method of claim 11 wherein the alkyl phenol comprises cresylic acid.

15. A method for cleaning oil wells comprising the step of introducing into an oil well a composition consisting essentially of about 97% to about 85% by volume of an aliphatic hydrocarbon petroleum distillate and about 3% to about 15% by volume of an alkyl phenol.

16. A composition for dissolving petroleum derived deposits consisting essentially of a mixture of about 85% to about 97% by volume of an aliphatic hydrocarbon, about 3% to about 15% by volume of an alkyl phenol, and an alkyl amine in an amount effective to enhance solubilization of petroleum derived deposits.

* * * * *